US012636527B2

(12) United States Patent
Turgeon

(10) Patent No.: US 12,636,527 B2
(45) Date of Patent: May 26, 2026

(54) FALL ARREST AND LOAD DISTRIBUTION HARNESS AND A METHOD FOR MANUFACTURING SAID HARNESS

(71) Applicant: BLUE ICE EUROPE, Les Houches (FR)

(72) Inventor: Maxime Turgeon, Les Houches (FR)

(73) Assignee: BLUE ICE EUROPE, Les Houches (FR)

( * ) Notice: Subject to any disclaimer, the term of this patent is extended or adjusted under 35 U.S.C. 154(b) by 681 days.

(21) Appl. No.: 17/998,084

(22) PCT Filed: Apr. 19, 2021

(86) PCT No.: PCT/FR2021/050684

§ 371 (c)(1),
(2) Date: Nov. 7, 2022

(87) PCT Pub. No.: WO2021/224555

PCT Pub. Date: Nov. 11, 2021

(65) Prior Publication Data

US 2023/0201639 A1 Jun. 29, 2023

(30) Foreign Application Priority Data

May 7, 2020 (FR) ..................................... 20/04525

(51) Int. Cl.
*A62B 35/00* (2006.01)

(52) U.S. Cl.
CPC ................................ *A62B 35/0025* (2013.01)

(58) Field of Classification Search
CPC .............. A62B 35/006; A62B 35/0012; A62B 35/0025; A62B 35/0075
See application file for complete search history.

(56) References Cited

U.S. PATENT DOCUMENTS

| | | | | |
|---|---|---|---|---|
| 10,675,490 | B2 * | 6/2020 | Blondeau | A62B 35/0025 |
| 2007/0209869 | A1 * | 9/2007 | Martin | D03D 15/587 182/6 |

(Continued)

FOREIGN PATENT DOCUMENTS

| | | | |
|---|---|---|---|
| EP | 1834543 | A1 | 9/2007 |
| WO | 0013536 | A1 | 3/2000 |
| WO | 2011107676 | A1 | 9/2011 |

OTHER PUBLICATIONS

Translation of WO2011107676 (Year: 2011).*

(Continued)

*Primary Examiner* — Jessica L Laux
(74) *Attorney, Agent, or Firm* — Conley Rose, P.C.

(57) ABSTRACT

A harness includes a belt and two separate thigh loops, in which at least one element selected from the belt and the thigh loops includes a first lower support strip to which at least, firstly, a first portion of an open coil and, secondly, a first upper cover strip are bonded. The at least first portion of the open coil is positioned between the lower support strip and the upper cover strip, the open coil having a single structural yarn wound on itself to form a number of yarn turns. The number of yarn turns of being greater than or equal to two, the two ends of the single structural yarn being independent of each other, the yarn turns of the open coil making it possible to distribute the tensile forces exerted on the single yarn in wound form.

6 Claims, 4 Drawing Sheets

(56) References Cited

U.S. PATENT DOCUMENTS

| | | | | |
|---|---|---|---|---|
| 2009/0071749 | A1 * | 3/2009 | Burlaud | A62B 35/04 57/210 |
| 2016/0096044 | A1 * | 4/2016 | Franke | A62B 35/0025 57/22 |
| 2016/0375278 | A1 | 12/2016 | Blondeau | |
| 2018/0078799 | A1 * | 3/2018 | Blondeau | A62B 35/0031 |

OTHER PUBLICATIONS

International Search Report issued Aug. 20, 2021 re: Application No. PCT/FR2021/050684, pp. 1-3, citing: WO 2011107676 A1, EP 1834543 A1, WO 0013536 A1 and US 20160096044 A1.

* cited by examiner

FALL ARREST AND LOAD DISTRIBUTION HARNESS AND A METHOD FOR MANUFACTURING SAID HARNESS

TECHNICAL FIELD

The present disclosure concerns an anti-fall and load distributor harness and a method for manufacturing said harness. This disclosure is particularly suited to a harness, also called a "climbing harness", intended to protect persons against falls when practicing alpineism, climbing, height works and touring ski.

BACKGROUND

In general, a harness is composed of a belt, a pair of leg loops, a flexible belay ring and structural and connecting elements connecting the pair of leg loops to the belt. The belt may possibly further comprise rings disposed over the belt for carrying material.

The primary aim of the harness is to protect persons against falls. To this end, a distribution of the tensile force is achieved over the belt and the pair of leg loops through the various structural and connecting elements present on the harness. The harness also serves as a support when a person is suspended in particular during maneuvers such as return descents. The distribution of the tensile forces, in particular during these different maneuvers, is crucial to ensure the safety of the person wearing the harness.

In order to best distribute the tensile forces of a harness, different types of belt and/or leg pairs have been developed.

The document US2016096044A describes a harness system comprising a belt and a pair of leg loops. The pair of leg loops includes a continuous cord with at least two non-braided regions and at least one splice coupling. The non-braided regions are disposed between braided regions and are disposed over the leg loop element to correspond to the legs of the user. The non-braided regions further comprise a plurality of separate strands oriented substantially parallel and equidistant from one another.

However, the pair of leg loops made with a continuous cord does not support great tensile forces. Moreover, the pair of leg loops made with a cord is uncomfortable for the person wearing it.

The application WO2011/107676 describes a roping harness equipped with a resistance harness attached on the surface of a support strip while cooperating with spacers to distribute the tensile forces exerted on the different spaced yarns. The bundle of yarns is shaped according to a plurality of elementary loops connected to strap rings arranged at the opposite ends of the support strip while allowing for a relative sliding movement of yarns for balancing the tensile forces.

The drawback of this harness is that the use of spacers increases the weight of the harness. Moreover, the arrangement of the yarns cooperating with the spacers, said yarns forming a plurality of elementary loops connected to return means arranged at the ends of the support complicates the manufacture of this harness. Finally, there is a risk that this arrangement does not best distribute the tensile forces and might cause injuries due to local areas with an excessive pressure in case of a fall.

The patent application EP1834543 discloses a load carrier system comprising a carrier textile strap, said strap comprising a woven portion having warp yarns extending along a longitudinal direction of the strap interlaced with at least one weft yarn, wherein said woven portion of the strap has a first width, wherein said strap has a non-woven portion comprising only at least one portion of said warp yarns, and wherein, in said non-woven portion, said warp yarns are spread transversely so as to spread over a second width larger than said first width of said woven portion.

The drawback of this system is that it is necessary to weave the strap before removing the weft, which complicates the manufacture of this system. Moreover, the production cost of this system is high.

SUMMARY

The present disclosure aims to propose a solution that overcomes the drawbacks listed hereinabove in connection with the state of the art.

In particular, the disclosure aims to propose a harness and a manufacturing method which guarantee a harness having an optimized weight and which has a high tensile strength, which is simple to manufacture and which allows safeguarding the user in all circumstances. Moreover, this harness comprises a minimum number of seams, which facilitates replicability thereof on an industrial scale.

This aim could be achieved by providing a harness comprising a belt and two distinct leg loops, wherein at least one element selected from among the belt and the leg loops comprises a first lower support strip onto which is bonded at least a first portion of an open coil on the one hand and a first upper overlay strip on the other hand so that said at least one first portion of the open coil is interposed between the lower support strip and the upper overlay strip, said open coil including a unique structural yarn wound on itself to form a plurality of yarn turns, the number of yarn turns of said plurality being greater than or equal to 2, the two ends of the unique structural yarn being independent of each other, the yarn turns of said open coil allowing distributing the tensile forces exerted on the wound unique yarn.

Such a harness has the advantage of having an optimized weight because it uses only one open coil subjected to tension and does not require a weft unlike a strap. Moreover, the use of an open coil allows distributing the tensile forces in the belt and/or in the leg loops very well. Furthermore, the harness is easy to manufacture because the manufacture requires few steps and components necessary for the manufacture thereof. Finally, the absence of seams in the belt and/or two leg loops allows for a better distribution of tensile forces, guaranteeing a very good safety for users, in all circumstances.

In one embodiment, the yarn turns are spaced apart so as to be disposed parallel to one another according to a direction substantially parallel to a longitudinal axis of the first lower support strip. This distribution of yarn turns allows guaranteeing a very good distribution of the tensile forces.

In one embodiment, over at least one portion of its length, the open coil has at least one first area where the yarn turns are distant from one another by a first mean interval and at least one second area where the yarn turns are distant from one another by a second mean interval strictly larger than the first mean interval, in particular in a transverse axis of the first support strip, the open coil therefore having a constriction at the level of first area.

Preferably, the yarn is made of polyamide or polyethylene. For example, the polyamide yarn is made of nylon. For example, the yarn is made of very high molecular weight polyethylene.

For example, the yarn has a weight comprised between 200 and 2,000 Deniers. By Denier it should be understood the weight in grams of the yarn for a length of 9,000 meters lengthwise. In this embodiment, such a thickness allows obtaining a yarn having a very high mechanical strength.

In one embodiment, the first lower support strip is composed at least of polyamide or polyester. For example, the first lower support strip is woven.

In one embodiment, the first upper overlay strip is made at least of polyurethane, polyamide or polyester. For example, the first upper overlay strip is composed of polyamide or polyester and is woven. For example, the first upper overlay strip is a polyurethane film.

In one embodiment, the first upper strip covers the entirety of the first lower support strip. For example, this embodiment could be implemented for the leg loops.

In one embodiment, the first upper strip covers a first portion of the first lower support strip and a second portion of the first lower support strip is not covered by the first upper overlay strip. For example, this embodiment could be implemented for the belt.

In one embodiment, one of the two leg loops comprises the first lower support strip and the first upper overlay strip, the other leg loop comprises a second lower support strip onto which is bonded at least a second portion of said open coil, distinct from the first portion, on the one hand and a second upper overlay strip distinct from the first upper overlay strip on the other hand, said first and second lower support strips being disposed equidistant from one another, said open coil passing through a bridge connecting the belt to the leg loops, the first and second upper overlay strips being disposed on either side of said bridge. In this embodiment, it is possible to manufacture a pair of leg loops in one piece resulting in an increased simplification of the method while improving the distribution of tensile forces. For example, in this embodiment, the portion of the coil passing through the bridge is surrounded by a protective film. In this embodiment, the friction of the coil with the bridge is significantly reduced and the coil is protected against wear.

In one embodiment, a connecting element connects the first and second support strips, independently of each other, so as to form a continuous circle. In this embodiment, the connecting element allows properly distributing the tensile forces. For example, the connecting element is a woven strip or a strap.

In one embodiment, the connecting element comprises a setting system.

In one embodiment, said at least one first area at the level of which the open coil has a constriction is not covered by the first upper overlay strip and/or by the second upper overlay strip.

In another embodiment, said at least one first area at the level of which the open coil has a constriction is covered by the first upper overlay strip and/or by the second upper overlay strip.

In one embodiment, connecting systems connect the belt and the two leg loops.

In this embodiment, the connecting systems allow improving holding of the person wearing it.

For example, the connecting systems comprise a setting system.

In one embodiment, the belt comprises a setting system.

The present disclosure also relates to a method for manufacturing a harness according to the disclosure, comprising the following steps:

a) winding of a unique structural yarn on itself in order to form an open coil where the two ends of the structural yarn are independent of each other, winding of the structural yarn being carried out around supports in such a manner that the open coil includes a plurality of yarn turns, the number of yarn turns of said plurality being greater than or equal to 2,
b) the deposition of at least one first portion of the open coil over a first lower support strip,
c) bonding of a first upper overlay strip onto said first lower support strip over which said at least one first portion of the open coil is deposited so that said at least one first portion of the open coil is interposed between the lower support strip and the upper overlay strip.

The method for manufacturing a harness according to the disclosure allows manufacturing a harness according to the disclosure easily. Moreover, the method according to the disclosure could be deployed easily on an industrial scale. Finally, the method according to the disclosure is easily adaptable to the production of different elements having various shapes for a harness.

In one embodiment, the supports have an elongated shape.

In one embodiment, the method comprises a shaping step, wherein said yarn turns of the open coil are spaced apart in a manner so as to space the yarn turns of the plurality from one another so as to be disposed parallel to one another according to a direction substantially parallel to a longitudinal axis of the first lower support strip.

In one embodiment, the shaping step is implemented during step a) and is carried out so that the supports allow separating said yarn turns from the open coil. In this embodiment, the supports also serve as spacers so as to avoid an additional step of the method. Step a) and the confirmation step are carried out simultaneously.

In one embodiment, the shaping step is implemented between steps a) and b) and is carried out so that at least one spacer element allowing separating said yarn turns is placed over the open coil. For example, the element is a comb, or a clamp. In this embodiment, a particular shape may be allocated to the coil.

In one embodiment, the method comprises a step of removing the spacer element, implemented after step b).

In one embodiment, the method comprises a tightening step in which the open coil is at least partially tightened at least at a first area of its length, the tightening step being implemented during step a) or between steps a) and b). Preferably, during the tightening step, the open coil is at least partially tightened along a transverse axis oriented transversely to the first lower support strip, for example with a clamp, an adhesive tape, a yarn or a cord. For example, the yarn or the cord is knotted around the coil along a transverse axis oriented transversely to the first lower support strip.

In one embodiment, the method comprises a step of preserving the shape of the coil implemented after step a). In this embodiment, specific locations of the coil are fixed so as to accommodate the particular coil shape. In one embodiment, the step of shaping the shape of the coil is carried out by applying at least one glue point over the open coil. In this embodiment, the glue points allow preserving a particular shape of the coil. Alternatively, the step of shaping the shape of the coil is carried out by placing clamps over the open coil. Alternatively, the step of shaping the shape of the coil is carried out by tying yarns around the open coil. In particular, the step of preserving the particular shape of the coil may be carried out when at least one element allowing separating said at least two yarn turns is placed over the coil in order to preserve a particular shape allocated to the coil.

In one embodiment, during step c), bonding is performed at cold temperature or by heat-bonding.

For example, cold bonding is performed using an adhesive.

In the case of heat-bonding, the lower support strip or the upper overlay strip is precoated with a polymer, in particular the face of the lower support strip or the upper overlay strip intended to be in contact with said at least first portion of the open coil is precoated with a polymer. A pressure is then exerted. It is associated with heat which allows crosslinking a polymer in order to obtain the adhesion properties.

In one embodiment, to form a pair of leg loops for the harness, step c) comprises bonding a second upper overlay strip onto a second lower support strip over which at least one second portion of the open coil is deposited.

In one embodiment, to form a belt for the harness, the entirety of the open coil is deposited, in step b), over the first lower support strip.

BRIEF DESCRIPTION OF THE DRAWINGS

Other aspects, aims, advantages and features of the disclosure will appear better upon reading the following detailed description of preferred embodiments thereof, provided as a non-limiting example, and with reference to the appended drawings wherein.

DETAILED DESCRIPTION OF THE DRAWINGS

Figure 1:
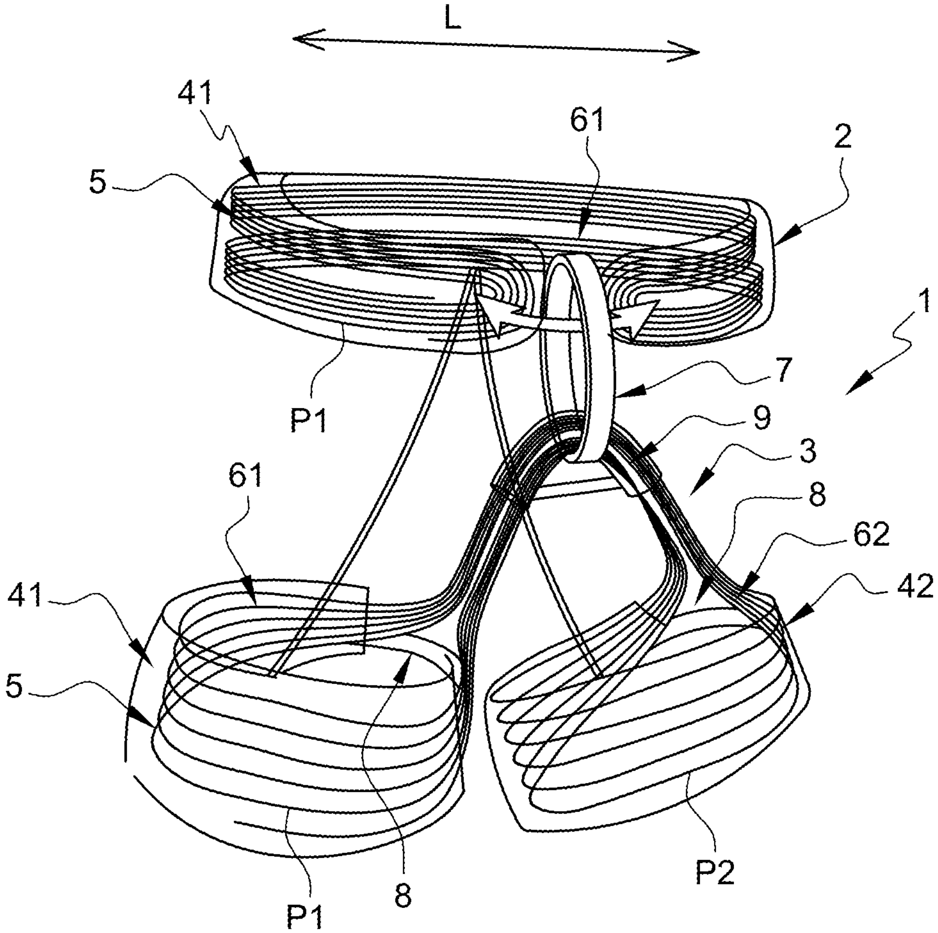
FIG. 1 illustrates an example of a harness according to the disclosure.

FIG. 1 illustrates a harness 1 comprising a belt 2 and two leg loops 3. In this example, each of the belt 2 and one of the two leg loops 3 comprises a first lower support strip 41 onto which is bonded at least a first portion P1 of an open coil 5 and a first upper overlay strip 61, said open coil 5 including a unique structural yarn wound on itself to form a plurality of yarn turns, the two ends of the unique structural yarn being independent of each other, i.e. not connected to each other. As regards the belt 2 and the leg loop 3, the corresponding open coil 5 may for example comprise at least thirty yarn turns in order to distribute the tensile forces exerted on the wound structural yarn.

In this example, each open coil 5 comprises at least thirty yarn turns spaced apart from one another so as to be disposed parallel to one another according to a direction substantially parallel to a longitudinal axis L of the corresponding first support strip 41.

The second leg loop may comprise a second lower support strip 42 onto which at least one second portion P2 of the open coil 5 is bonded and a second upper strip 62, said first and second lower support strips 41, 42 being disposed equidistant from one another. The coil 5 can pass through a bridge 7 connecting the belt 2 to the leg loops 3, the first and second upper overlay strips 61, 62 being disposed on either side of the bridge 7.

A binding member 8 may connect, independently of each other, the first and second lower support strips 41, 42 so as to form a continuous circle.

The coil 5 may be surrounded by a protective film 9.

Figure 2:
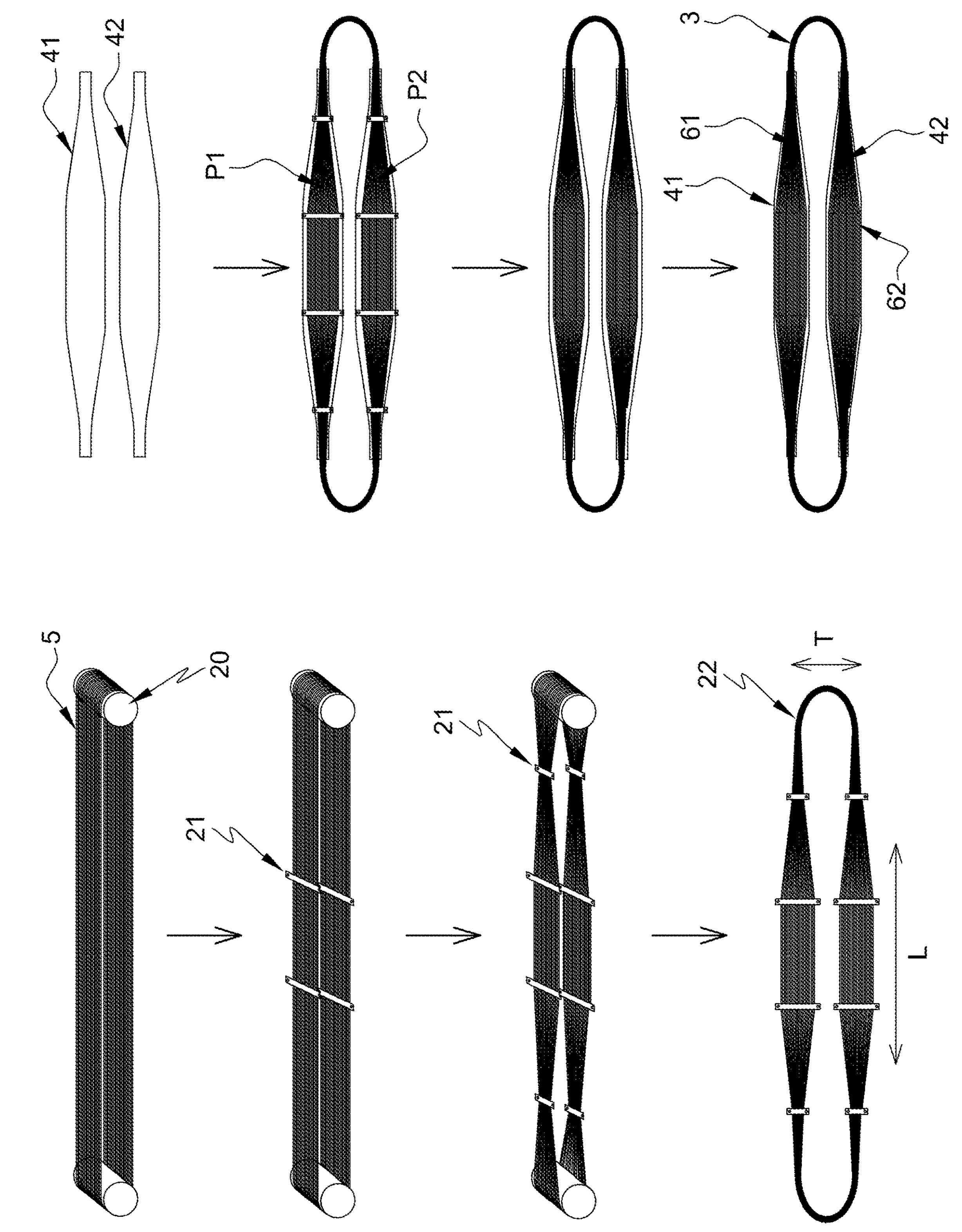
FIG. 2 illustrates an example of a method for manufacturing a harness comprising a pair of leg loops according to the disclosure.

FIG. 2 illustrates an example of a method for manufacturing a harness comprising two leg loops 3, comprising a step a) including winding a unique structural yarn on itself in order to form an open coil 5 where the two ends are independent of each other, winding of the yarn being carried out around supports 20 having an elongated shape in such a manner that the open coil 5 includes a plurality of yarn turns, the number of yarn turns of said plurality being greater than or equal to 2.

In a shaping step, eight spacers 21 are placed at some locations of the open coil 5 to space the yarn turns of the coil 5 apart in a manner spacing the yarn turns of the plurality from one another so as to be disposed parallel to one another according a direction substantially parallel to the longitudinal axis L of the first lower support strip 41.

To hold the coil 5 in the particular shape illustrated in FIG. 2, in a glue application step, glue points may be applied over the open coil 5.

Afterwards, a first portion of the coil P1 is deposited over the first lower support strip 41 and a second portion P2 is deposited over the second lower support strip 42.

Afterwards, the spacers 21 are removed.

In a step c), the first and second upper strips 61, 62 are for example heat-bonded onto said first and second lower support strips 41, 42 over which are deposited at least the first portion P1 and the second portion P2 of the open coil 5. To this end, for example, the faces of the upper strips 61, 62 intended to be in contact with said at least one first portion P1 of the coil 5 are pre-coated with a polymer.

In this example, the first upper strip 61 covers the entirety of the first lower support strip 41. Moreover, the places where the coil 5 is at least partially tightened are not covered by the first upper strip 61 or the second upper strip 62.

Two leg loops 3 are then obtained. The open coil 5 could subsequently be inserted into the bridge 7 connecting the belt 2 to obtain a harness 1 as illustrated in FIG. 1.

Figure 3:
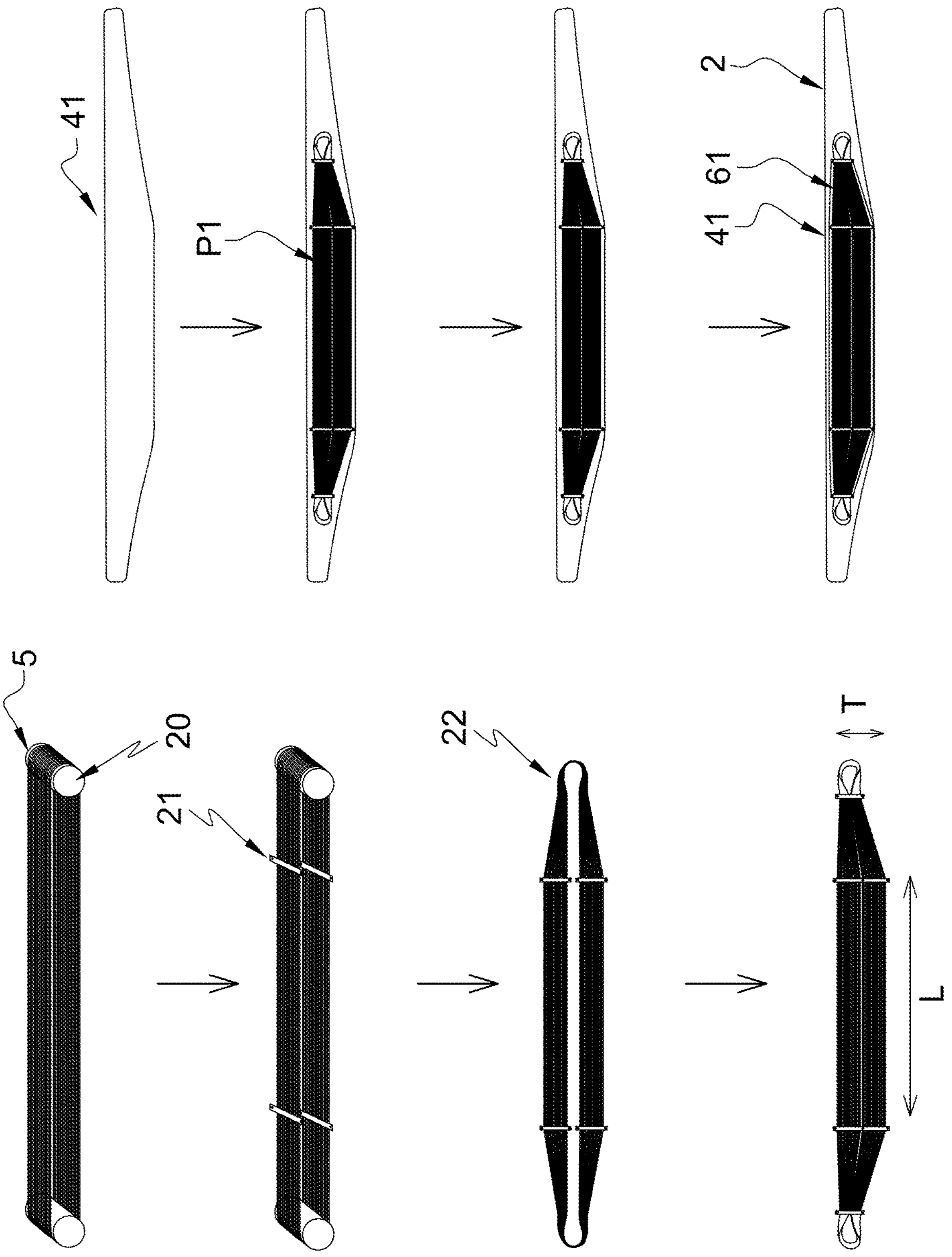
FIG. 3 illustrates an example of a method for manufacturing a harness comprising a belt according to the disclosure.

FIG. 3 illustrates an example of a method for manufacturing a harness according to the disclosure comprising a step a) including winding of a unique structured yarn on itself in order to form an open coil 5 where the two ends are independent of each other, winding of the yarn being carried out around supports 20 having an elongated shape in such a manner that the open coil 5 includes a plurality of yarn turns, the number of yarn turns of said plurality being greater than or equal to 2.

In a shaping step, six spacers 21 are placed at some locations of the coil in order to space the yarn turns of the open coil 5 apart in a manner spacing the yarn turns from one another so as to be disposed parallel to one another according to a direction substantially parallel to a longitudinal axis L of the first lower support strip 41.

In a tightening step, the coil 5 may be partially tightened along a transverse axis T oriented transversely to the first lower support strip 41 with a clamp, an adhesive tape, a yarn or a cord 22.

To hold the coil 5 in the particular shape illustrated in FIG. 3, in a glue point application step, glue points may be applied over the coil 5.

Afterwards, a first portion P1 of the coil 5 is deposited over the first lower support strip 41.

Afterwards, the spacers 21 are removed. For example, the spacers are combs or clamps.

In a step c), the first upper strip 61 is for example heat-bonded onto said first lower support strip 41 over which at least the first portion P1 of the coil 5 is deposited. To this end, for example, the face of the first upper strip 61 intended to be in contact with said at least one first portion P1 of the coil 5 is pre-coated with a polymer.

In this example, the first upper strip 61 covers a portion of the first lower support strip 41. Moreover, the places where the coil 5 is at least partially tightened are not covered by the first upper strip 61.

A belt 2 is then obtained. It could subsequently be connected to the bridge 7 also connecting two leg loops 3 to obtain a harness 1 as illustrated in FIG. 1.

Figure 4:
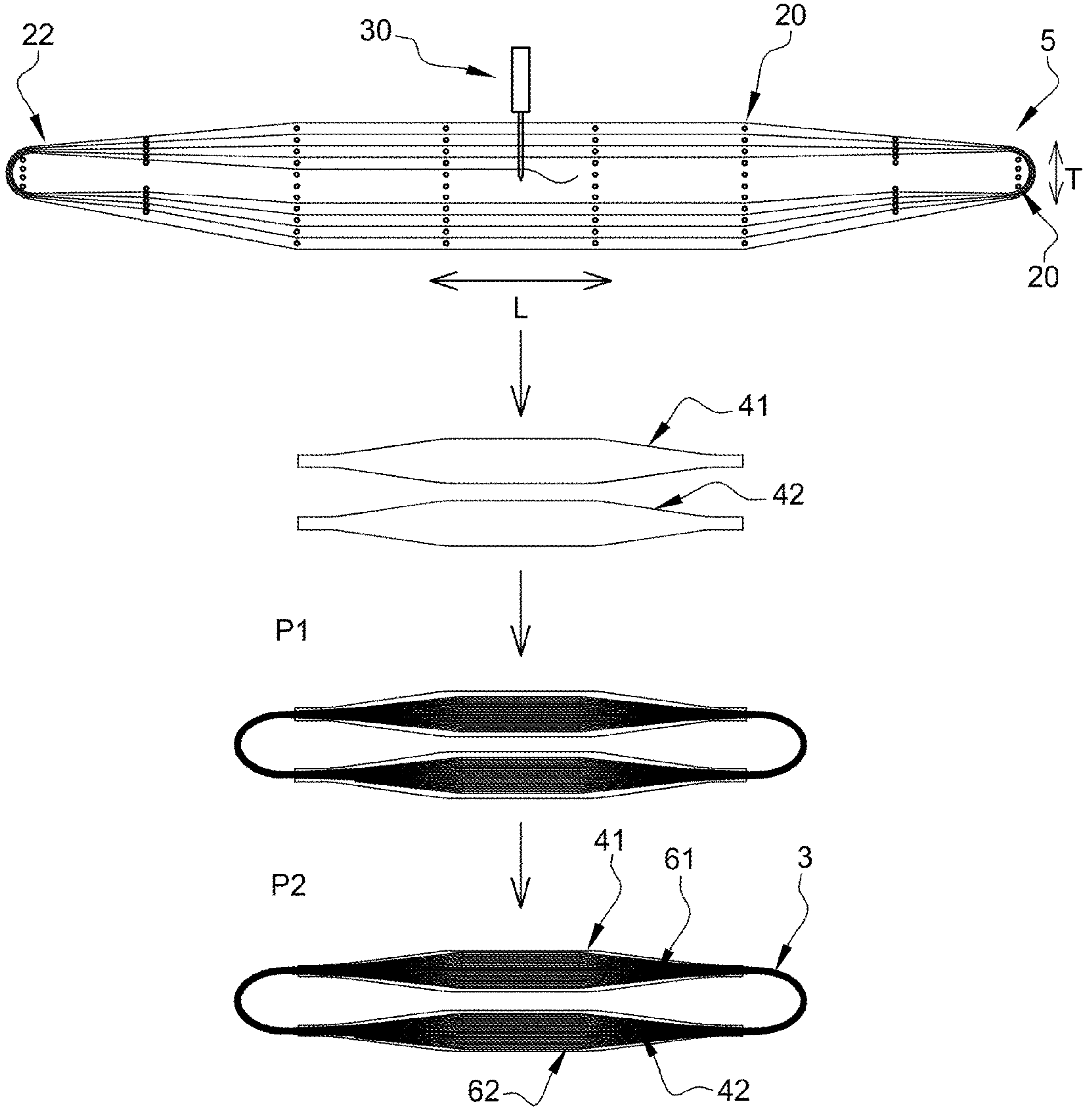
FIG. 4 illustrates an example of a method for manufacturing a harness comprising a pair of leg loops according to the disclosure.

FIG. 4 illustrates an example of a method for manufacturing a harness comprising two leg loops 3, comprising a step a) including winding of a unique structural yarn on itself in order to form an open coil 5 where the two ends are independent of each other, winding of the yarn being carried out around supports 20 having an elongated shape in such a manner that the open coil 5 includes a plurality of yarn turns, the number of yarn turns of said plurality being greater than or equal to 2. For example, a device 30 unwinds the yarn around the supports 20 so as to form the coil 5.

In this example, a shaping step is carried out during step a), in which said yarn turns of the open coil 5 are spaced apart so as to space the yarn turns of the plurality from one another so as to be disposed parallel to one another according to a direction substantially parallel to a longitudinal axis L of the first lower support strip 41. In this step, the supports 20 allow spacing said yarn turns apart from the open coil 5. Thus, the supports 20 also serve as spacers.

To hold the coil 5 in the particular shape illustrated in FIG. 4, in a step of preserving the shape of the coil, glue points may be applied on the open coil 5.

In a tightening step, the coil 5 may be partially tightened along a transverse axis T oriented transversely to the first lower support strip 41 with a clamp, an adhesive tape, a yarn or a cord 22.

Afterwards, a first portion of the coil P1 is deposited over the first support strip 41 and a second portion P2 is deposited over the second lower support strip 42.

In a step c), the first and second upper strips 61, 62 are for example heat-bonded onto said first and second lower support strips 41, 42 over which are deposited at least the first portion P1 and the second portion P2 of the open coil 5. To this end, for example, the faces of the lower strips 41, 42 intended to be in contact with said at least one first portion P1 of the coil 5 are pre-coated with a polymer.

In this example, the first upper strip 61 covers the entirety of the first lower support strip 41. Moreover, the places where the coil 5 is at least partially tightened are not covered by the first upper strip 61 or the second upper strip 62.

Two leg loops 3 are then obtained. The open coil 5 could subsequently be inserted into the bridge 7 connecting the belt 2 to obtain a harness 1 as illustrated in FIG. 1.

The harness 1 according to the disclosure allows solving the drawbacks of the prior art by proposing an architecture that is simple, comfortable and safe for the user in all circumstances and that offers excellent distribution of tensile forces in order to guarantee optimum safety for the users.

The invention claimed is:

1. A harness comprising: a belt and two distinct leg loops, wherein at least one element selected from among the belt and the leg loops comprises a first lower support strip onto which are bonded at least a first portion of an open coil and a first upper overlay strip so that said at least first portion of the open coil is interposed between the lower support strip and the upper overlay strip, said open coil including a structural yarn wound on itself to form a plurality of yarn turns, wherein the number of yarn turns of said plurality of yarn turns is greater than or equal to two, two ends of the structural yarn being independent of each other, wherein the two ends are not connected to each other such that the two ends are separated and distant from each other, the yarn turns of said open coil allowing distributing the tensile forces exerted on the wound yarn.

2. The harness according to claim 1, wherein the yarn turns of the plurality of yarn turns are spaced apart so as to be disposed parallel to one another in a direction substantially parallel to a longitudinal axis of the first lower support strip.

3. The harness according to claim 1, wherein over at least one portion of the open coil length, the open coil has at least a first area where the yarn turns are distant from one another according to a first mean interval and at least one second area where the yarn turns are distant from one another according to a second mean interval larger than the first mean interval, in a transverse axis of the first support strip, the open coil having a constriction at the level of the first area.

4. The harness according to claim 1, wherein the first upper overlay strip covers the entirety of the first lower support strip.

5. The harness according to claim 1, wherein the first upper overlay strip covers a first portion of the first lower support strip and wherein a second portion of the first lower support strip is not covered by the first upper overlay strip.

6. The harness according to claim 1, wherein one of the two leg loops comprising the first lower support strip and the first upper overlay strip, the other of the two leg loops comprises a second lower support strip onto which is bonded at least a second portion of said open coil, distinct from the first portion, and a second upper overlay strip distinct from the first upper overlay strip, said first and second lower support strips being disposed equidistant from one another, said open coil passing through a bridge connecting the belt to the leg loops, the first and second upper overlay strips being disposed on either side of said bridge.

* * * * *